C. T. SMITH & G. W. FORSYTHE.
CUSHION WHEEL.
APPLICATION FILED NOV. 27, 1917.

1,295,378.

Patented Feb. 25, 1919.
3 SHEETS—SHEET 1.

Claude T. Smith
George W. Forsythe
INVENTORS

BY
Mason Fenwick & Lawrence
ATTORNEYS

C. T. SMITH & G. W. FORSYTHE.
CUSHION WHEEL.
APPLICATION FILED NOV. 27, 1917.
1,295,378.
Patented Feb. 25, 1919.
3 SHEETS—SHEET 2.
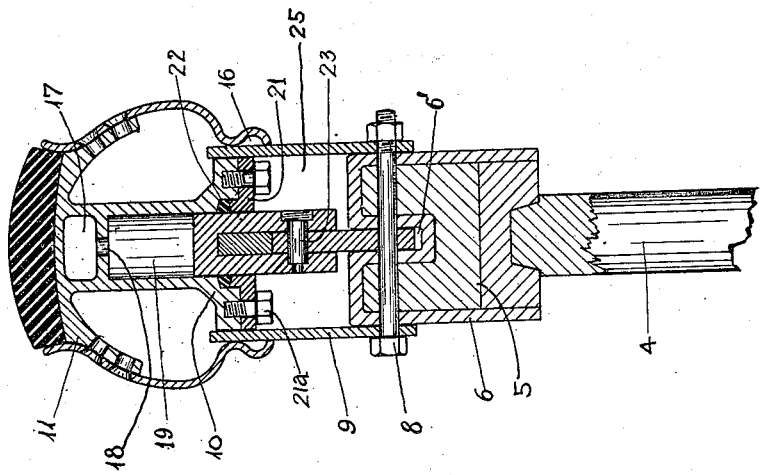
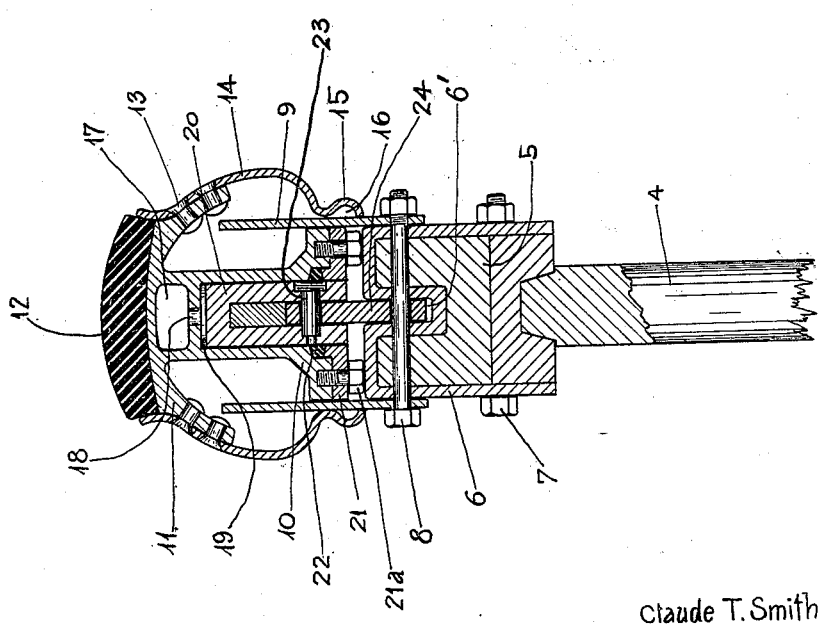
Claude T. Smith
George W. Forsythe. Inventors C. T. SMITH & G. W. FORSYTHE.
CUSHION WHEEL.
APPLICATION FILED NOV. 27, 1917.
1,295,378.
Patented Feb. 25, 1919.
3 SHEETS—SHEET 3.
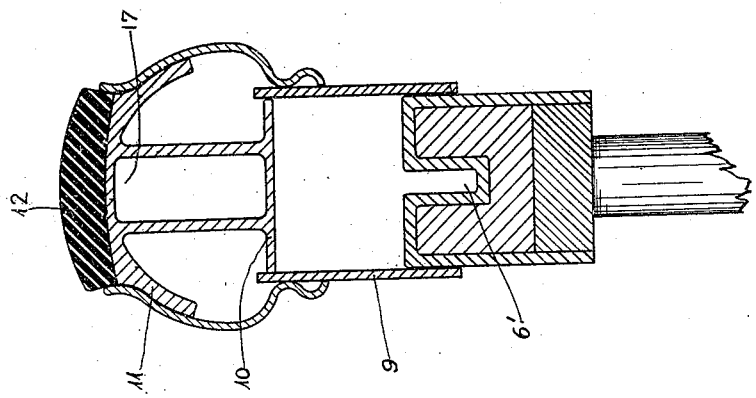
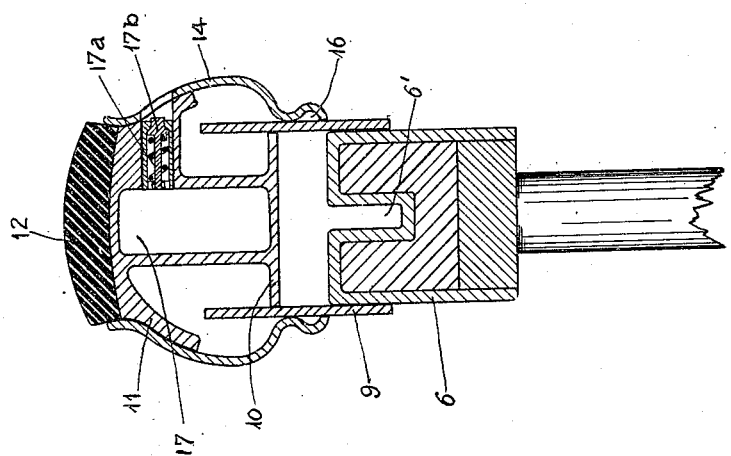
Claude T. Smith
George W. Forsythe *Inventors*
By *Mason Fenwick & Lawrence,*
Attorneys

UNITED STATES PATENT OFFICE.

CLAUDE T. SMITH AND GEORGE W. FORSYTHE, OF DENVER, COLORADO.

CUSHION-WHEEL.

1,295,378.  Specification of Letters Patent.  Patented Feb. 25, 1919.

Application filed November 27, 1917. Serial No. 204,220.

*To all whom it may concern:*

Be it known that we, CLAUDE T. SMITH and GEORGE W. FORSYTHE, citizens of the United States, residing at Denver, in the county of Denver and State of Colorado, have invented certain new and useful Improvements in Cushion-Wheels; and we do hereby declare the following to be a full, clear, and exact description of the invention, such as will enable others skilled in the art to which it appertains to make and use the same.

This invention relates to vehicle wheels and more particularly to an improvement in resilient wheels.

It is one of the objects of the present invention to provide a puncture-proof wheel with parts so connected, organized and constructed as to eliminate the requirement of the usual pneumatic or rubber tires and yet provide for the desired degree of resiliency between the tire and the wheel structure. A further object of the invention is to improve the construction of resilient wheels by the utilization of relatively movable, central and tire members which are connected by means for transferring pressure from the wheel structure to the tire structure, which means are controlled in relative action means through the medium of a liquid, preferably in the form of oil. Another object of the invention is to provide a wheel involving relatively movable, liquid-controlled elements in combination with means for permitting radial non-lateral movement of the tire with relation to the wheel structure and which will facilitate the assembling and disassembling of the elements and will also prevent the access of dust or other gritty material to the pressure controlled connections between the central wheel and the tire.

With these and other objects in view as will be rendered manifest in the following specification, the invention consists in the details of construction and in the combination of the parts, a form of the invention being illustrated in the accompanying drawing in which:

Fig. 2 is a section radially of the wheel and tire on line 2—2 of Fig. 1, showing a piston in collapsed position with respect to the tire.

Fig. 3 is a radial section on line 3—3 of Fig. 1.

Fig. 4 is a section on line 4—4 of Fig. 1 to show the filling orifice of the oil chamber, and Fig. 5 is a section on line 5—5 of Fig. 1, showing the construction through one of the radial planes, transversely of the felly and tire.

Figure 1:
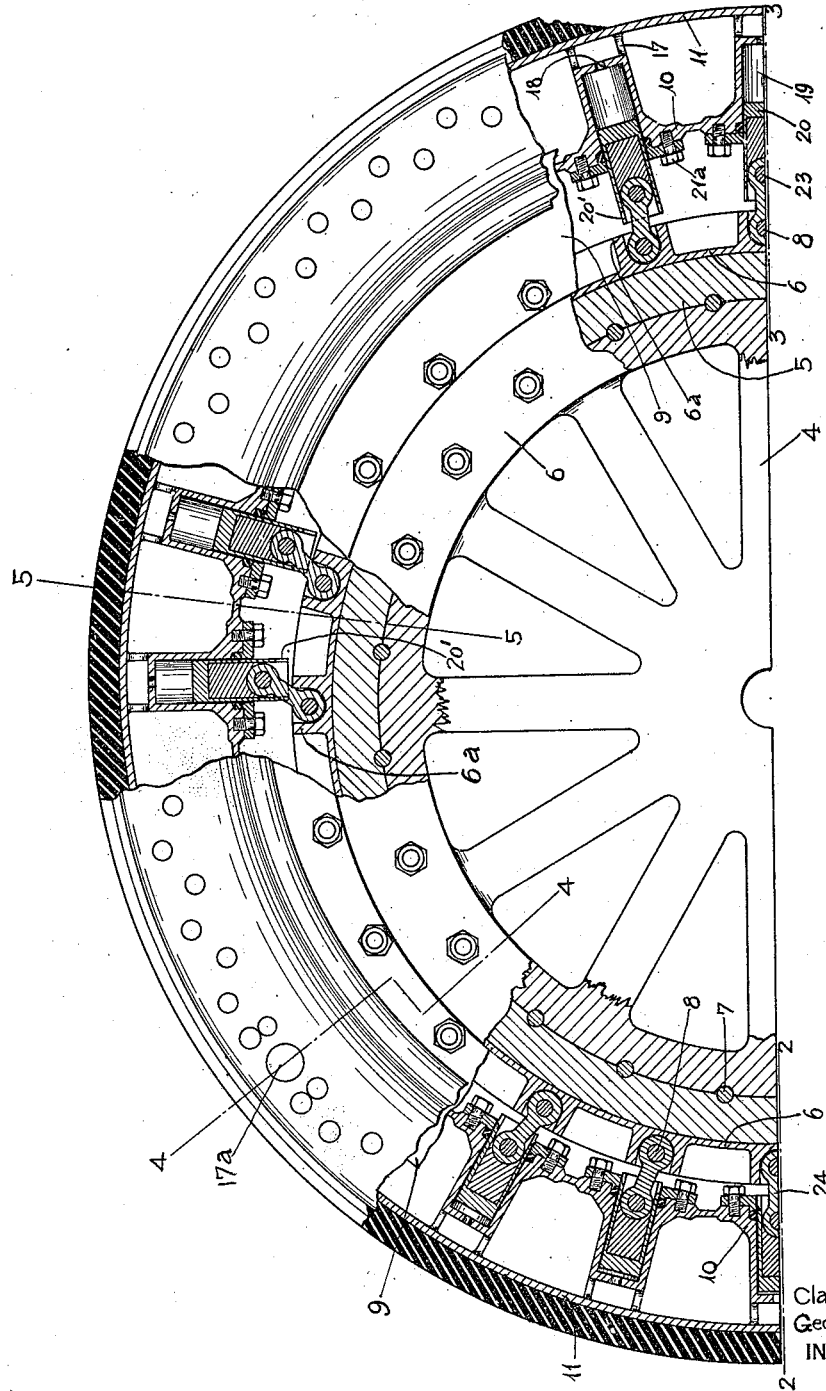
Figure 1 is a sectional side elevation of a portion of the improved wheel.

In the embodiment of the invention illustrated in the accompanying drawings, a central wheel structure is disclosed embodying the spoked-hub 4, which is provided with any suitable construction of felly 5, which may be of wood or other material and which is shown as incased within a metallic substantially channel-shaped rim 6, secured thereto by bolts 7 and 8. The latter also serve the purpose of securing to the felly parallel flange rings 9, which project above the peripheral face of the rim 6 and embrace a centrally projecting portion 10 formed of or connected to a tire shell 11, which preferably is provided with a rubber or other portion 12, designed to take the minor road shocks and suitably secured, as by rivets or bolts indicated at 13, passing through flanges of the shell 11, to and overlapping these flanges, are side plates 14, shown as of substantially concavo-convex transverse section. The inner edges 15, of the plates 14 are preferably beaded to form pockets 16 for the reception of a suitable packing material to prevent the ingress of dust or other gritty matter along the outer surface of the flange rings 9 over which the packing beads 15 are adapted to play.

The tire shell 11 is provided, as above mentioned, with a central inwardly projecting portion 10, the outer part of which is designed to form an endless circular liquid-receiving chamber or compartment 17 of suitable proportions and which communicates, through head orifices 18, with each of a plurality of piston chambers 19, which are here shown as radially disposed and in which reciprocate respective pistons 20, the radial inner ends of which are embraced by packing glands 21, secured by screws or other suitable means 21ª, to hold packing 22 in the inner ends of the piston chambers 19 for the purpose of preventing the loss of liquid, such as oil, from the compartment 17.

The radial inner ends of the pistons 20 are each shown as connected by a respective pin 23 to a link or connecting rod 24, the inner end of each of which is shown as pivotally mounted upon its connecting bolt 8, which bolts are also utilized to secure the lateral rings 9 to the wheel, rim and felly, although it is understood, of course, that any other suitable connection between the inner ends of the several links 24 and the felly may be utilized. The planes of the several links 24 are shown as parallel to the plane of the wheel construction and the pivot pins 8 and 23 of the links are shown as disposed transversely to the diameter of the wheel thus allowing for a radial and tangential movement of the tire structure with relation to the central wheel structure 4.

For the purpose of securing compactness of organization and eliminating undue lateral movement of the links 24, the felly rim 6 is shown as provided with a substantially continuous, central, peripheral groove or recess 6' to receive the adjacent ends of the links 24, this groove allowing for the pivotal movement of the links on their pivots 8, and if desired, the swinging movement about these pivots may be limited as shown in Fig. 1 by the provision of shoulders 6ª at opposite edges of the ends of the links, the shoulders being adapted to abut the adjacent edges of the links when the latter have swung to a pre-determined angle with relation to the wheel structure 4. To permit the desired degree of swinging movement of the links 24 about their pins 23 in the ends of the pistons 20, the sides of each of the latter may be slotted as at 20' to clear the edges of the links up to a desired angle at which point these edges will abut on the sides of the pistons so that coöperative with the shoulders 6ª of the annular rim 6, positive means are provided to prevent an excess of overthrow of the wheel structure with relation to the tire structure.

From the foregoing, it will be seen that when the compartment 17 is filled with a liquid, preferably oil, and there is relative movement between the tire structure and the central wheel structure, the pistons 20 will be moved in their respective chambers 19, so that there will be a tendency of the oil to pass into or out of the chambers according to the direction of movement of the pistons, and this tendency is more or less restricted through the provision of the apertures 18, the proportion of which may be determined as required, so that the resistance of the flow of material will react upon the pistons 20 and relative movement of the wheel member and the tire member cushioned or retarded to the requisite degree and the transmission of shocks from the tire to the wheel structure thus eliminated. The chambers 17 may be supplied with the necessary charge of oil or other liquid through means of a filling orifice 17ª which may be closed by an inwardly opening valve 17ᵇ or by other means if desired. The chambers formed within the tire structure by the side flanges 14 attached to the shell may be filled with a thick grease which will provide for the lubrication of the adjacent plates 9 and the packing beads 16 at their working joints and will also serve to prevent the ingress of dust or other gritty material.

In practice it may be more desirable to leave the chambers inside of flanges 14 vacant and place the thick grease in the space 25 where it would lubricate the connecting rods and associated parts as well as the inner surface of the plates 9 and from which place it will work through to some extent into the chambers within the tire structure above referred to and will thus also lubricate the outer side of the plates 9. The principal need of lubrication, however, is on the inner side of the plates 9 and the lubrication may be provided for in the manner above described.

We claim:

1. A vehicle wheel comprising a central wheel structure, a tire member encircling the felly and having an annular continuous liquid compartment, piston chambers communicating through constricted, valveless openings with said annular compartment, and pistons connected to the felly and operating in said chambers, said compartment adapted to contain a liquid to resist the movement of the pistons relative to the tire, the openings providing for induction and eduction of liquid as the pistons reciprocate.

2. A vehicle wheel comprising a central wheel structure with a felly, parallel flanges on and projecting beyond the felly, a tire member encircling the felly and having side flanges overlapping and bearing on the felly flanges, and an annular continuous compartment disposed between the tire flanges, piston chambers communicating with said annular compartment, and pistons connected to the felly and operating in said chambers, said compartment adapted to contain a liquid to resist the movement of the pistons relative to the tire.

3. A vehicle wheel comprising a central wheel structure, a tire member encircling the felly and having an annular continuous compartment, radial piston chambers communicating with said annular compartment, side flanges on the felly between which said compartment is movably disposed, and pistons connected to the felly and operating in said chambers, said compartment adapted to contain a liquid to resist the movement of the pistons relative to the tire.

4. A vehicle wheel comprising a central wheel structure, a tire member encircling the felly and having an annular continuous fluid compartment, radial piston chambers communicating with said compartment, side flanges on the felly between the planes of which said compartment is movably disposed, and pistons connected to the felly and operating in said chambers, and a liquid controlling the actions of the pistons in the chambers.

5. The combination of a springless wheel having a felly, a tire shell having guided radial movement thereon and provided with a series of valveless related piston chambers, pistons movable therein, and means connecting the pistons and said felly, and a liquid controlling the actions of the pistons in the chambers.

6. The combination of a springless wheel having a felly, a tire shell having guided radial movement thereon and provided with a series of valveless, related piston chambers, pistons movable therein, and links connecting the pistons and said felly, and a liquid controlling the actions of the pistons in the chambers.

7. A yielding wheel structure comprising a central organization having a felly with laterally disposed parallel flanges projecting beyond the circumference of the felly, and a tire structure comprising a shell having side sections overlapping said flanges and having a central tubular body portion operative between and slidably fitting the inside surface of said flanges whereby inner and outer lubricating compartments are formed, the tire and the felly being flexibly connected together by fluid controlled means.

8. A yielding wheel structure comprising a central organization having a felly with laterally disposed parallel flanges projecting beyond the circumference of the felly and a tire structure comprising a shell having side sections overlapping said flanges and having a central tubular body portion operative between and slidably fitting the inside surface of said flanges whereby inner and outer lubricating compartments are formed, the tire and the felly being flexibly connected together by fluid controlled means, said central body portion including a series of inter-communicating piston chambers having constricted communication with a common compartment.

9. A fluid pressure controlled wheel comprising a central wheel structure having a felly with outwardly projecting parallel flanges extending beyond the periphery and a tire comprising a tread bearing member having an annular hollow body portion extending inwardly and bearing at its side edges upon the inner surfaces of said flanges and forming therewith a lubricating compartment between the felly and the annular face of said body portion, and flexible means connecting said felly and tire and controlled by a fluid movable in the hollow body.

10. A fluid pressure controlled wheel comprising a central wheel structure having a felly with outwardly projecting parallel flanges extending beyond the periphery and a tire comprising a tread bearing member having an annular hollow body portion extending inwardly and bearing at its side edges upon the inner surfaces of said flanges and forming therewith a lubricating compartment between the felly and the annular face of said body portion, and flexible means connecting said felly and tire and controlled by a fluid movable in the hollow body, and lateral side members on the tire body overlapping the outside of said flanges and forming dust-proof and liquid-tight chambers with the central body portion and into which said flanges project.

In testimony whereof we affix our signatures.

CLAUDE T. SMITH.
GEORGE W. FORSYTHE.

Copies of this patent may be obtained for five cents each, by addressing the "Commissioner of Patents, Washington, D. C."